US008363637B2

(12) United States Patent
Bettis et al.

(10) Patent No.: US 8,363,637 B2
(45) Date of Patent: Jan. 29, 2013

(54) TELEPHONY PROTOCOL SERVER AND TELEPHONY PROTOCOL CLIENT IN A DISTRIBUTED IP ARCHITECTURE TELECOMMUNICATIONS SYSTEM

(75) Inventors: Sonny R. Bettis, Lawrenceville, GA (US); Philip L. Lowman, Ellijay, GA (US); James H. Spencer, Tucker, GA (US)

(73) Assignee: Movius Interactive Inc., Johns Creek, GA (US)

(*) Notice: Subject to any disclaimer, the term of this patent is extended or adjusted under 35 U.S.C. 154(b) by 1191 days.

(21) Appl. No.: 11/170,538

(22) Filed: Jun. 29, 2005

(65) Prior Publication Data

US 2006/0013201 A1    Jan. 19, 2006

Related U.S. Application Data

(60) Provisional application No. 60/584,117, filed on Jun. 30, 2004.

(51) Int. Cl.
*H04L 12/66* (2006.01)

(52) U.S. Cl. ............. 370/352; 370/395.5; 379/221.09; 379/93.01

(58) Field of Classification Search .......... 370/214, 370/254, 310, 351, 395.2, 395.52, 419, 426, 370/352, 395.5; 379/90.01, 93.01, 219, 221.08–221.1
See application file for complete search history.

(56) References Cited

U.S. PATENT DOCUMENTS

| | | | |
|---|---|---|---|
| 5,995,608 A * | 11/1999 | Detampel et al. | 379/205.01 |
| 6,215,790 B1 * | 4/2001 | Voit et al. | 370/401 |
| 6,333,931 B1 | 12/2001 | Lapier | |
| 6,611,533 B1 * | 8/2003 | Liao et al. | 370/467 |
| 6,865,266 B1 * | 3/2005 | Pershan | 379/221.13 |
| 6,920,144 B2 | 7/2005 | Niermann | |
| 6,965,777 B1 * | 11/2005 | Cast et al. | 455/466 |
| 7,010,002 B2 * | 3/2006 | Chow et al. | 370/485 |
| 7,136,477 B2 * | 11/2006 | Craig et al. | 379/230 |
| 7,181,227 B2 * | 2/2007 | Wilson et al. | 455/456.1 |
| 7,197,036 B2 * | 3/2007 | Craig | 370/392 |
| 2001/0002927 A1 * | 6/2001 | Detampel et al. | 379/202 |
| 2003/0021293 A1 | 1/2003 | Harasaki | |

(Continued)

FOREIGN PATENT DOCUMENTS

WO    WO00/39969 A    7/2000

OTHER PUBLICATIONS

Sidebottom G et al: "RFC 332 Signaling System 7 (SS7) Message Transfer Part 3 (MTP3)—User Adaptation Layer (M3UA)", Internet Citation, Sep. 1, 2002, XP002247869, Retrieved from the Internet: URL:www.ietf.org, retrieved on Jul. 16, 2003, relevant sections include, Abstract, sections 1.1, 1.2, 1.4.1, 1.4.2.4, 1.4.4.1, 4.1.1, 7.3, Appendix A.1, A.2.2, Figures 1, 2, 5.

(Continued)

*Primary Examiner* — Michael Thier
*Assistant Examiner* — Curtis A Alia
(74) *Attorney, Agent, or Firm* — Smith Risley Tempel Santos LLC; Gregory Scott Smith (57) ABSTRACT

A telephone system architecture enabling various components of a telephone system to be distributed geographically yet operates as a seamlessly integrated system. A signaling gateway interfaces to the PSTN and through an SS7 interface. The signaling gateway includes a telephony protocol server. At least one other component of the telephone system includes a telephony protocol client. The telephony protocol client and telephony protocol server communicate over an Internet Protocol (IP) network. The telephony protocol server provides access to the PSTN to the component having the telephony protocol client. Any functions in the various components that require an SS7 interface to the PSTN are simply handled through the signaling gateway by the telephony protocol server.

17 Claims, 4 Drawing Sheets

U.S. PATENT DOCUMENTS

| | | | |
|---|---|---|---|
| 2003/0072330 A1* | 4/2003 | Yang et al. | 370/493 |
| 2003/0076815 A1* | 4/2003 | Miller et al. | 370/352 |
| 2003/0161296 A1* | 8/2003 | Butler et al. | 370/352 |
| 2004/0017905 A1* | 1/2004 | Warrier et al. | 379/114.15 |
| 2004/0042485 A1* | 3/2004 | Gettala et al. | 370/465 |
| 2004/0090954 A1* | 5/2004 | Zhang et al. | 370/352 |

OTHER PUBLICATIONS

Hyunjeong Lee et al., "A redundancy method of AS traffic in signaling gateway using loadsharing scheme", Advanced Communication Tecnology, 2004., The 6th International conference on Phoenix Park, Korea Feb. 9-11, 2004, Piscataway, NJ, USA, IEEE LNKD-DOI:10.1109/ICACT. 2004.1292986, vol. 2, Feb. 9, 2004, pp. 833-837, XP010702327, ISBN 978-89-5519-119-6.

IPCablecom Internet signalling transport protocol (ISTP); J. 165 (05/03), ITU-T Standard in Force (I), International Telecommunication Union, Geneva, CH, No. J.165, May 29, 2003, XP017401815. Relevant sectiosn include 1, 5.2, 5.3, 6.1, 6.2, 6.3, 7.1, 7.6, 8.2.3, 8.3.2.1, 8.3.3.3, Figures 2, 4, 5.

Normand Glaude, Tom Blain "IP Signaling Gateway Transport Architecture", IETF Standard-Working-Draft, Internet Engineering Task Force, IETF, CH, Nov. 27, 1998, XP015013655, ISSN: 0000-0004. Relevant sections include 1, 1.1, 6, 6.1, 6.2, 6.3, 7; Figs 1, 2.

Translation of Notice of Reasons for Rejection issued by Japan Patent Office on Jan. 25, 2011 for a foreign counter part JP 2007-519395 of the present application.

* cited by examiner

TELEPHONY PROTOCOL SERVER AND TELEPHONY PROTOCOL CLIENT IN A DISTRIBUTED IP ARCHITECTURE TELECOMMUNICATIONS SYSTEM

CROSS-REFERENCE TO RELATED APPLICATIONS

This application claims the benefit of the filing date of United States Provisional Application for Patent entitled DISTRIBUTED IP ARCHITECTURE FOR TELECOMMUNICATIONS SYSTEM, filed on Jun. 30, 2004 and assigned Ser. No. 60/584,117.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates to distributed IP systems and telecommunication systems and, more particularly, to a multi-functional telecommunications system with geographically dispersible components that interact over a distributed IP architecture.

Over the past several decades, voice mail has continued to expand and establish itself as a key element in the successful operations of most businesses. The typical voice mail system today can take on a variety of forms, including a computer card that can operate within a personal computer that is connected to a businesses telephone system, or a computer card or component that is directly integrated into the businesses telephone system, or as a service provided by a telecommunications company.

The common ingredient to each of the voice mail systems available today is that the components that make up the voice mail system must communicate with each other and thus, must be co-located. This can be a great disadvantage for companies that have geographically dispersed offices.

In today's global economy, even small business may have a need for multiple offices for serving clients, interacting with vendors, or various other reasons. The advent of the Internet, email and video conferencing helps to allow such dispersed operations appear more seamless. However, a significant problem that still exists for dispersed offices is having a common telephonic system that operates as a single, co-located system but serves the needs of the various offices. Generally, each office purchases and maintains its own telephone system without any direct interface between the telephone systems of the various offices and without any central control. This can be a costly endeavor in that duplicative hardware must be purchased and maintained at each site. In addition, the logistics of inter-office communication such as call transfers, voice mail retrieval etc. can be complex. Thus, there is a need in the art for a telecommunications system that allows seamless integration for remotely located offices.

In addition, even if a seamless integration of a telephone system is obtained, there still exists a need for personalization of the telephone systems in the various offices. For instance, if the offices are located in different time zones, it may be important to have the ability for each office to uniquely set up the system for handling incoming calls, switching the system to night or weekend mode, entering or deleting individuals from the system etc. Thus, there is a need in the art for a distributed telephone system that provides seamless integration, while at the same time allowing components of the system to be individually programmed and/or maintained at the remote offices.

SUMMARY OF THE INVENTION

The present invention is directed towards a distributed telecommunications system and a distributed architecture for building such a telecommunications system. The telecommunications system provides functionality that is typical of what is required in most modern small or large business settings, such as call forwarding, auto-attendant, voice mail, voice messaging, etc. The telecommunications system is made up of several components that can be located in various locations that are remote from each other. Each of the components includes an interface to an IP network such as the Internet. A single component or class of components (signaling gateway) interfaces to a switched telephone network using the signaling system seven (SS7) suite of protocols. Each of the other components in the telecommunications system that would require such an interface to the switched telephone network simply communicates through the signaling gateway.

Each component in the telecommunication system communicates with the other components through the IP network. This advantageously allows the components to be geographically dispersed yet to operate as a single, seamless telecommunications system.

More particularly, one embodiment of the present invention includes a signaling gateway, a media server, an application server and a central message and data store. The signaling gateway includes a signaling interface to a telephone network, such as an SS7 interface and an interface to an IP network. The media server includes a circuit-switched interface to the telephone network for receiving and initiating telephone services over the telephone network. The media server also includes an interface to the IP network. The media server operates to provide communication services, such as voice mail, voice messaging, voice-based menus, etc to callers and subscribers over circuit switched connections through the telephone network.

The media server operates closely in conjunction with the application server and communicates with the application server over the IP network. The media server receives requests for services and then request the provision of those services through the application server. The application server provides the functionality for providing various communication servers to callers and subscribers. The central data and message store provides configuration information that is used to control the operation of the communication services provided by the application server.

In operation, a media server, located at a first location, may receive a request for a communications service. The request for a communications service can take on a variety of forms including, but not limited to receiving an incoming call, receiving a request for a call origination, receiving a menu selection of a voice-based menu. The media server response to the request by either invoking or calling up an application from the application server. Depending on the particular embodiment of the invention, the application server can simply provide the application to the media server to render, or can be partially or entirely rendered by the application server. In rendering the communications service, the central data and message store may be accessed to obtain particular configuration or customization information pertaining to the provision of the communications service. While the communications service is being provided, the media server may receive additional feedback from a calling party or subscriber and the application will respond correspondingly. For instance, the communications service may include a voice mail function. In this case, the application will prompt a calling party to leave a voice message. The voice message can then be received and stored in the central data and message store. Other features, capabilities and advantages of the present invention are more fully described with reference to the figures and the detailed description.

BRIEF DESCRIPTION OF THE DRAWINGS

Various aspects, features and advantages of the present invention will become fully appreciated as the same becomes better understood when considered in conjunction with the accompanying drawings, in which like reference characters designate the same or similar parts throughout the several views, and wherein.

BRIEF DESCRIPTION OF THE DRAWINGS

DETAILED DESCRIPTION OF THE INVENTION

The present invention provides a distributed IP architecture, also described as a next-generation communications platform, for telecommunications equipment, such as a PBX, voicemail system, or the like. By utilizing the architecture of the present invention, the various functionalities of the telecommunications equipment can be divided amongst various physical components and the physical components can be geographically dispersed. Each of the components communicates with each other, as needed, through independent interfaces to an IP network. The complexities of interfacing to the telephone network are handled through a single gateway component and a simplified protocol is used for communication between the remaining components of the telecommunications equipment or to the telephone network through the gateway component.

Now turning to the drawings, in which like labels refer to like elements throughout the several views, various aspects and features of the present invention are described.

Figure 1:
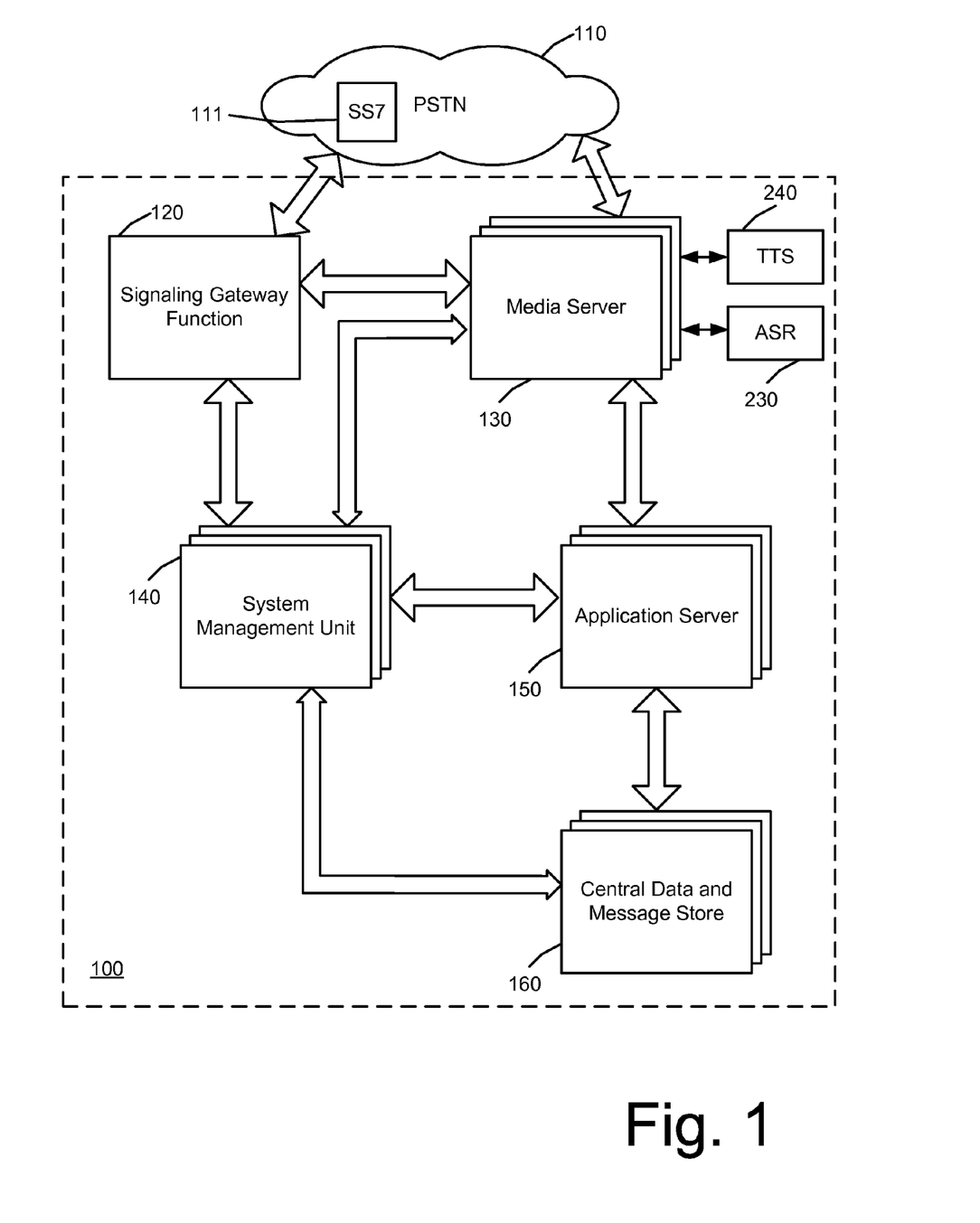
FIG. 1 is a system diagram illustrating the components and the connectivity of an exemplary next-generation communications platform of the present invention.

FIG. 1 is a system diagram illustrating the components and the connectivity of an exemplary next-generation communications platform of the present invention. One aspect of the present invention is a distributed IP-based architecture for telecommunications equipment that, among other things, can provide telecommunication services such as voice mail, call forwarding and other telecommunication features. In the illustrated embodiment, the next-generation communications platform 100 has a distributed IP architecture and is connected to the Public Switched Telephone Network (PSTN) 110, which includes a Signaling System 7 network 111. The communications platform 100 is illustrated as including a signaling gateway function (SGF) 120, one or more media servers (MS) 130, one or more system management units (SMU) 140, one or more application servers (AS) 150 and one or more central data and message store (CDMS) 160. It should be understood that the distribution of functionality illustrated in the figures and described, although having novel aspects in itself, is not the only acceptable arrangement, and aspects of the present invention could be incorporated into a system that includes fewer or more components and a different arrangement of functionality among the components.

The SGF 120 serves as an interface to the PSTN 110 and the next-generation communications platform 100. For the sake of clarity, the PTSN 110 will be described as employing Signaling System 7 (SS7), and the SGF 120 will be described as interfacing with the PTSN 110 using SS7 protocols. However, it should be noted that the present invention is not limited to SS7 interfaces and that other telephony protocols are intended to be within the scope of the present invention.

The SGF 120 serves as the Signaling System 7 (SS7) interface to the PSTN 110 and allows one or more components or sub-systems to share the same point code (thereby reducing the need for destination point codes (DPC) and signaling links for call-control. In some embodiments, the next-generation communications platform 100 appears as a single trunk group to the SS7 network 111 of the PTSN 110 due to the sharing of the point code. However, in other embodiments, the next-generation communications platform 100 appears can appears to the SS7 network as having multiple trunk groups.

The media server 130 terminates IP and/or circuit switched traffic from the PSTN via a multi-interface design and is responsible for trunking and call control. The application server module 150 generates dynamic VoiceXML pages for various applications and renders the pages through the media server 130 and provides an external interface via a web application server configuration. The SMU 140 is a management portal that enables service providers to provision and maintain subscriber accounts and manage network elements from a centralized web interface. The CDMS 160 stores voice messages, subscriber records, and manages specific application functions including notification. Each of these sub-systems are described in more detail following.

Each of the components in the next-generation communications platform is independently scalable and independently interconnected onto an IP network. Thus, the components can be geographically distributed but still operate as a single communications platform as long as they can communicate with each other over the IP network. This is a significant advantage of the present invention that is not available in state-of-the-art communication systems.

Signaling Gateway Function (SGF)

The SGF 120 offers a consolidated signaling interface creating a single virtual SS7 signaling point for the next generation communications platform. SS7 provides the extra horsepower networks need, whether large or small. A SIGTRAN interface (IETF SS7 telephony signaling over IP) to the multifunction media server 130 as well as IP Proxy functions are supported via the SGF 120. Consolidating SS7 into a single component (in this case the SGF 120) of the next-generation communications platform provides the benefits of reduced point codes, cost efficiency in the design of the other components and easier maintenance.

Each signaling point in the SS7 network is uniquely identified by a numeric point code. Point codes are carried in signaling messages exchanged between signaling points to identify the source and destination of each message. Each signaling point uses a routing table to select the appropriate signaling path for each message.

There are three kinds of signaling points in the SS7 network: SSP (Service Switching Point), STP (Signal Transfer Point) and SCP (Service Control Point). SSPs are switches that originate, terminate or tandem calls. An SSP sends signaling messages to other SSPs to setup, manage and release voice circuits required to complete a call. An SSP may also send a query message to a centralized database (an SCP) to determine how to route a call (e.g., a toll-free 1-800/888 call in North America). An SCP sends a response to the originating SSP containing the routing number(s) associated with the dialed number. An alternate routing number may be used by the SSP if the primary number is busy or the call is unanswered within a specified time. Actual call features vary from network to network and from service to service.

Network traffic between signaling points may be routed via a packet switch called an STP. An STP routes each incoming message to an outgoing signaling link based on routing information contained in the SS7 message. Because it acts as a network hub, an STP provides improved utilization of the SS7 network by eliminating the need for direct links between signaling points. An STP may perform global title translation, a procedure by which the destination signaling point is determined from digits present in the signaling message (e.g., the dialed 800 number, calling card number or mobile subscriber identification number).

An STP can also act as a "firewall" to screen SS7 messages exchanged with other networks. Because the SS7 network is critical to call processing, SCPs and STPs are usually deployed in mated pair configurations in separate physical locations to ensure network-wide service in the event of an isolated failure. Links between signaling points are also provisioned in pairs. Traffic is shared across all links in the link set. If one of the links fails, the signaling traffic is rerouted over another link in the link set. The SS7 protocol provides both error correction and retransmission capabilities to allow continued service in the event of signaling point or link failures.

The availability of point codes is typically limited. The consolidation of signaling links eases the pressure on these resources or eliminates the need for additional point codes altogether. Thus, the consolidated signaling interface in the SGF 120 provides immediate network simplification and cost savings. The SGF 120 presents the appearance of a single identity to the SS7 network via the single "virtual" point code of the messaging network and recognizes and processes messages in a transparent manner. The SGF 120 can potentially reduce the maximum number of point codes needed in some cases from 50 to only four.

From a networking perspective, the SGF 120 looks like an STP to the rest of the network giving access to the various components of the next-generation communications platform through the use of virtual point codes. In accordance with the distributed aspects of the present invention, multiple SGFs may be incorporated into the system. In this configuration, multiple paths to the various components of the next-generation communications platform are available.

Each SGF 120 includes virtual point codes that are used to access the various components in the communications platform. Only one destination point code is necessary for the entire communications platform. The SGFs communicate with each other to synchronize the virtual point codes for the media servers and other components integrated into the communications platform. Thus, if one SGF fails, access to the communications platform is easily provided through another SGF.

This is significantly different and advantageous over each of the components in the next generation communications platform looking like synchronized SS7 stacks.

In and exemplary embodiment, the SGF 120 server supports N+1 fail over redundancy schemes and load sharing configurations and is built on an Intel server. A minimum of two SGFs is recommended for load sharing and redundancy purposes for increased availability. As with all platform components, SNMP alarming, logging, and transaction detail records are generated. Features, advantages and benefits of the SGF include:

Allows multiple media servers to share signaling links and point codes providing significant cost savings;

Provides concentrated SS7 signaling links;

Can provide one trunk group across multiple multi-function media servers;

SGF 120 requires less SS7 links resulting in reduced monthly connection fees; and The SGF 120 is a key component in the ability to implement an IP distributed architecture for the communications platform.

Another aspect of the present invention allows each SGF in the system to be coupled to an interface block that mimics a subset of an STP interface. In implementation, each SGF in the system includes a virtual point code that is used when accessing the SGF. Since each SGF looks like an STP to the switching network, the switching network can route any communications to any SGF by simply directing it towards a different STP. Thus, if a failure occurs, the system can still reach any SGF in the system. This technique advantageously alleviates the expense associated with obtaining and maintaining Destination Point Codes (DPC) within a system. Using this invention, only one DPC is required for the entire system. Other systems that provide such an STP interface, generally require a complex synchronization process to occur between the private networks attached to the STP interfaces. However, in this invention, the synchronization process is not necessary and thus, the system is substantially less complex.

Figure 4:
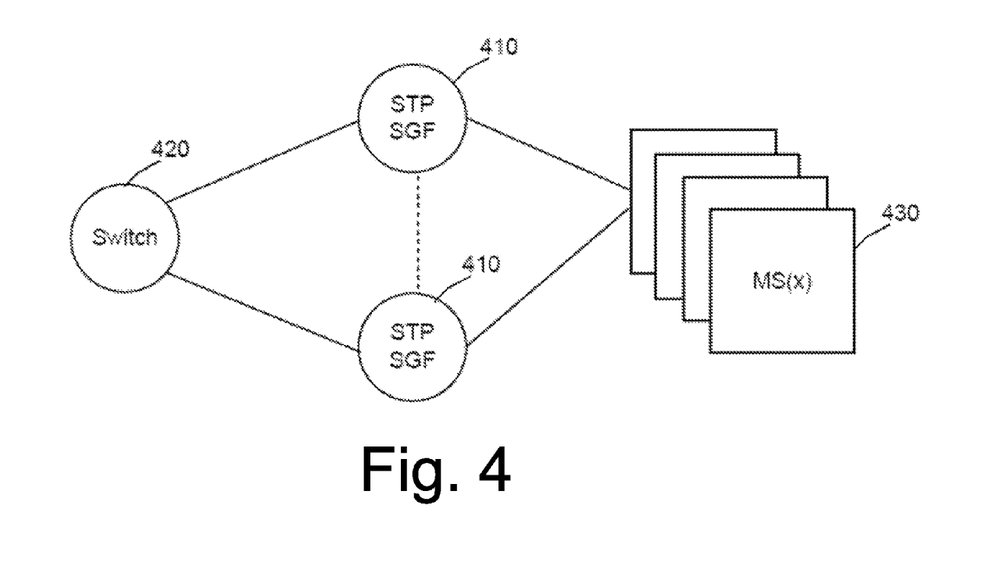
FIG. 4 is a conceptual diagram of the employment of the SGs.

Referring to FIG. 4, a conceptual diagram of the employment of the SGFs is illustrated. The SGF's 410 look to the switch 420 as a standard STP and thus, the switch can communicate with any SGF through any STP. In addition, the switch can access a Media Server 430 on the platform through any SGF on the platform. Only one DPC is required for this architecture whereas in prior art systems, each media server would require its own DPC.

Media Server (MS)

The MS 130 terminates IP traffic from the SGF 120 and circuit-switched traffic from the PSTN 110. The MS 130 is responsible for call set up and control within the platform architecture. The MS 130 processes input from the user in either voice, DTMF format or other signaling scheme (much like a web client gathers keyboard and mouse click input from a user). The MS 130 then presents the content back to the user in voice form (similar in principle to graphic and text displayed back to the user on a PC client). This client/server methodology is important in the platform architecture in that it enables rapid creation of new applications and quick utilization of content available on the World Wide Web.

The MS 130 processes incoming calls via requests to the AS 150 using HTTP. A load balancer preferably directs traffic arriving at the multi-function MS 130 to one of a plurality of ASs 150. This functionality ensures that traffic is allocated evenly between active servers. The multi-function MS 130 works as the VoiceXML client on behalf of the end user in much the same manner as a client like Netscape works on behalf of an HTML user on a PC. A VoiceXML or CCXML browser residing on a multi-function media server interprets the VoiceXML documents for presentation to users.

VoiceXML is a standards-based scripting language for developing voice-enabled software applications. This means that developers use and leverage Web-based (HTML) development expertise in developing speech-based telephony applications.

Figure 2:
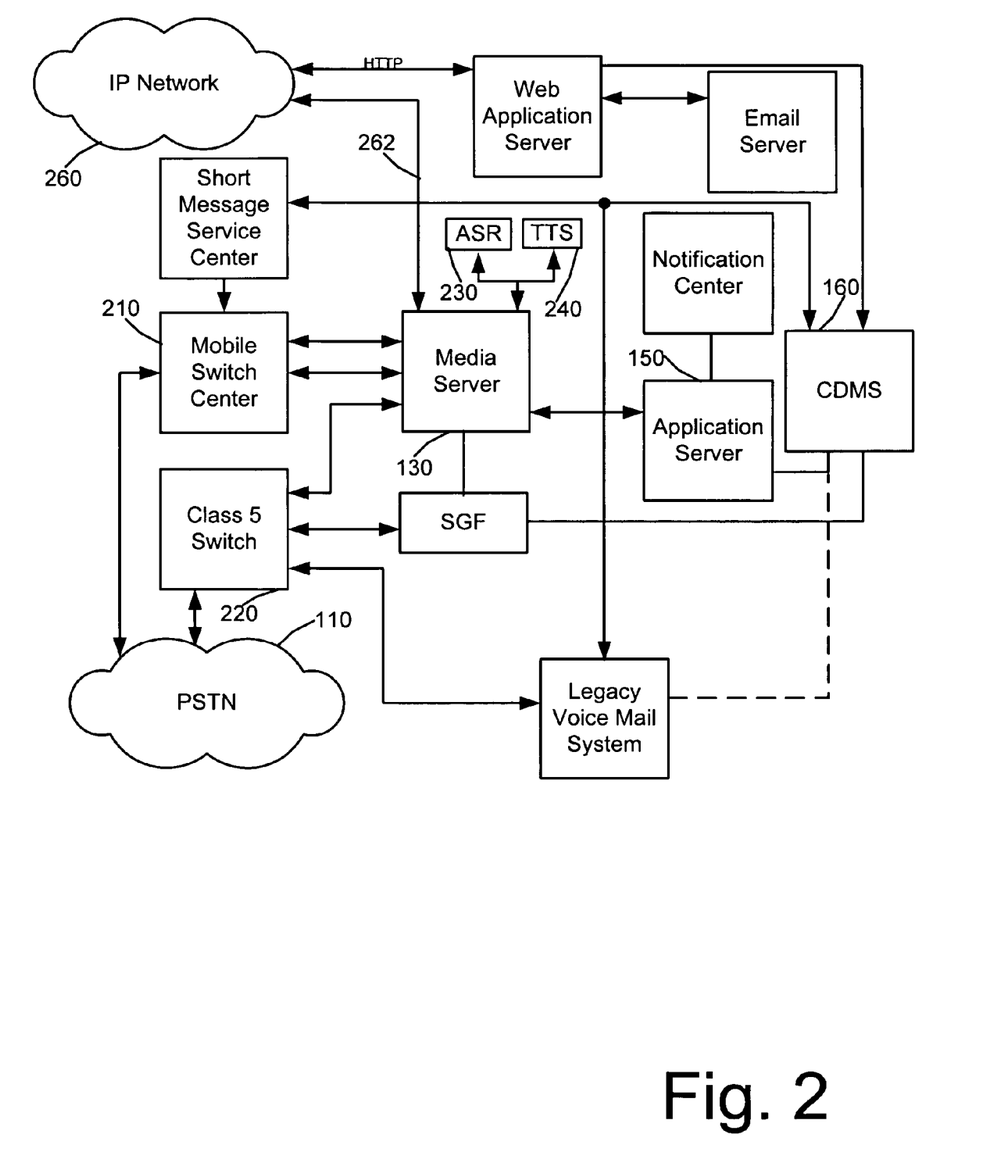
FIG. 2 is a block diagram illustrating the inter-working of the next generation communications platform.

FIG. 2 is a block diagram illustrating the inter-working of a media server 130 in a next generation communications platform. The media server 130 interfaces with the PSTN 110 through a mobile switch center 210 over a T1/E1 interface and/or an ISDN/PRI interface and through a class 5 switch 220 or similar switch through a T1/E1 interface. The media server 130 may also interface to an automatic speech recognition (ASR) server 230 and/or a text-to-speech server (TTS) 240. The media server 130 may also provide voice over IP (VOIP) support based on the SIP, the H.323 or other standards through an appropriate interface 262 to an IP network 260. In a typical embodiment, the VoIP can be supported through G.711 and G.723 voice encoding—techniques that are well known to those skilled in the art. Preferably, the media server 130 can include a built-in abstraction layer for interface with multiple speech vendors. Advantageously, this aspect of the media server 130 enables the elimination of dependency on a single ASR 230 or TTS 240 vendor.

In addition, in a preferable embodiment, the media server 130 is constructed of commercial-off-the-shelf (COTS) hardware and software components and is a carrier-grade server. Telephony interface and resource boards for telephony-specific applications can also be added. For instance, a facsimile card or software can be added to the media server 130 to manage facsimile termination.

In one embodiment, the next-generation communications platform 100 is configured to provide notification messages to subscriber's of the next-generation communications platform 100 via the SS7 network 111. The CDMS 160 generates a notification message for the subscriber. Typically, the notification message is generated when the subscriber receives a call from a particular caller or from a particular telephone number. Notification messages can be generated upon other types of criteria such as when the subscriber's voice-mail box is full or almost full or when it has reached a certain amount of its capacity. The CDMS 160 generates a notification message and provides the notification message to the SGF 120. The SGF 120 receives the notification message and provides the notification message, or the payload of the notification message, to the SS7 network 111 via the switch 220. Typically, the notification message from the CDMS 160 to SGF 120 includes a payload that conforms to a protocol such as, but not limited to, Short Messaging Service (SMS).

Application Server (AS)

The modular design of the next-generation communications platform has the added advantage that it is easy to deploy enhanced services, such as voice dialing and voice navigation, unified communications solutions, multimedia messaging services, and presence & availability management applications. Adding applications to the platform is accomplished via the addition of standard application servers 150 to the common platform.

Each application server 150 generates application documents (VoiceXML pages) in response to requests from the media server 130 via the internal Ethernet network. The application server 150 leverages a web application infrastructure to interface with back-end data stores (messages stores, user profile databases, content servers) to generate the VoiceXML based documents.

The overall web application infrastructure separates the core service logic (i.e., providing the business logic) from the presentation details (VoiceXML, CCXML, SALT, XHTML, WML) to provide a more extensible application architecture. The application server 150 utilizes Java 2 Enterprise Edition (J2EE) environment and Java Server Pages (JSP) to create the dynamic VoiceXML pages for the multi-function media server. Combining these technologies enables rapid incorporation of Speech Application Language Tags (SALT) to provide interoperability (multimodal) between applications like WAP, HTML, XHTML and voice—allowing the end user to simultaneously input data via voice command and receive presentation via WAP or HTML.

To create an environment for easy application development, the application server 150 preferably supports Template+JSPs. Applications are implemented in JSPs using an API for access to messaging functions. These JSPs are readily modifiable making changes in application behavior and creation of new applications very easy.

The cooperation of the media server 130 and the application server 150 allows for customization of certain features to be offered to particular subscribers. For instance, if a company has one office on the west coast and another office on the east coast, the operation of the telephone system, particularly the media server 130 and the application server 150 for each office may be quite different. For instance, the voice mail system and auto attendant may go to night-time mode in the east coast office at 6:00 PM Easter Time and at the west coast office at 6:00 PM Pacific Time. In addition, the menu structure and prompts provided by the various offices may be substantially different. For instance, a dial by name directory would include different employees. With the present invention, separate media servers can be located at the two offices and the media servers 130 can render different communication services. The different communication services could be rendered from different application servers 150, co-located with the media servers 130, or through a common application server that can serve a communications services application based on the location or an ID of the media server 130.

In addition, remotely located media servers 130 can provide common functionality to the various subscribers and callers as well as provide a seamless integration of the telephone system from the perspective of both the subscribers and users. A company may want to present a voicemail and auto attendant interface that seamlessly serves all locations of the company. The present invention can be utilized to provide such functionality. The application server 150 can render a tiered dial by name or menu selection function that first allows callers to select an office and then, an application server 150 and/or media server 130 invokes a particular function to provide dial by name services for that particular office. Alternatively, the application server 150 may maintain access to a single CDMS 160 or multiple CDMSs 160 that include all of the subscriber information for all offices of the company. The application server 150 can then provide a single level menu structure for a company wide dial by name directory.

Common Database and Message Store (CDMS)

The next-generation communications platform uses the CDMS 160 to store voice/audio messages, subscriber records, and to manage certain application functions such as notification schedules. The CDMS 160 is preferably designed with fully redundant components and utilizes reflective memory and Redundant Array of Independent Disks (RAID) technology for fault tolerance, immediate fail over and recovery. This ensures five 9's availability for associated hardware and software components. Essential disk drive and RAID controller components are preferably "hot swappable" eliminating the need to power down the system for replacements. With the CDMS 160, performance is optimized for the unique characteristics of voice messaging, eliminating the performance degrading, unnecessary e-mail-centric database functionality that comes with the searching and sorting of e-mail stores.

The CDMS 160 can utilize standard of the shelf e-mail storage systems. The message store is abstracted through the use of Java middleware that allows the selection of the message store to be transparent to the application, enabling each message type to be stored in the most efficient store possible.

System Management Unit (SMU)

The SMU 140 provides a centralized point for service providers to manage all network elements, providing remote access, maintenance, and backup functionality. The SMU 140 provides a single interface for provisioning, alarming, reports, and subscriber migration. The SMU 140 integrates and customizes systems with new elements and applications, and provides operational support and network management functions for carriers experiencing swiftly growing networks and exploding traffic volumes. Core features of the SMU component include:

Element Auto-Discovery—when service providers add new network elements, the SMU automatically recognizes them and includes the new elements in the graphical network map.

Graphical Network Map—a network/cluster map and map editor provides a snapshot of the entire network or cluster and facilitates quick problem identification and resolution.

Time Synchronization—a central time source ensures all network components maintain a uniform time reference across the entire messaging network—important for any distributed architecture.

Centralized network logging—logging for the entire messaging network is centralized on the SMU 140.

The SMU 140 uses a dual processor computer and allows remote dial-in for access to the SMU 140 server as well as all other servers in the system via Telnet. Backup of system configurations and other critical data can also accomplished via the SMU.

Advantageously, the next-generation communications platform as described, allows for the quick and cost-effective deployment of a variety of applications, all from a single architectural source. Utilization of an open-source, Java-based Applications Creation environment makes this high degree of flexibility possible. Utilizing the communications platform, operators can create compelling bundles of best-in-class messaging and communications services ranging from basic call answering to forward looking applications like multimedia messaging and presence enabled solutions. To further facilitate the user experience, the next generation communications platform may also provide a web interface for subscribers to add and modify their preferences and features on a "self-serve" basis. This capability increases usage by consumers, improves customer loyalty, and also reduces service provider operating costs through fewer routine service calls.

Another advantage of the communications platform is the ability to include and incorporate a variety of applications. Whether the application is native on the platform or sourced from a third party vendor, the applications allow the communications platform to be customized for various customer needs and product differentiation. Some of the applications that can be easily incorporated into the communications platform include the following.

Voice Mail—Provides subscribers with a variety of features designed around the exchange of voice messages content.

Multimedia Messaging—MMS allows subscribers to personalize their communications with up-to-the-minute multimedia content such as photos and music to create messaging that breaks the boundaries of traditional communication. With features like Message Composer, Photo Album and Greeting Cards, subscribers can send and receive dynamic multimedia content on their MMS-capable mobile phones, PDAs and PCs. Subscribers can also send multimedia content to non-MMS subscribers via the Internet, driving traffic to an operator's website thereby increasing subscriber usage.

Unified Communications—A complete package of services customized to your subscribers' needs, including voice, fax and e-mail messaging, a single mailbox for all message types, an integrated address book, and special on-line management and personalization tools.

Multi-Party Personal Conference Service—Gives subscribers the ability to initiate instant conferences with friends/family.

Voice-Enabled Messaging Services—Powerful voice-controlled telephony services. Subscribers have access to an array of services through their own personal contact number and an easy-to-use voice interface that features natural language recognition and optional text-to-speech capability. Features common to a Voice Enabled Messaging Suite include navigation of voice mail via spoken commands, voice dialing and a voice controlled address book, delivered on an IP-based architecture compliant with industry standards such as VoiceXML and SALT.

Voice MMS—Enables subscribers to have greater access and control over their communication channels by allowing newly deposited voice mail messages to be delivered to an MMS-capable handset or e-mail box in the form of an audio clip. Subscribers can also share voice messages via e-mail and to forward voice messages to destinations outside of their voice mail system.

Another aspect of the present invention is a transaction vehicle for the delivery of control and data. Utilizing the same SGF 120 components as previously described, a transactional vehicle centered around the Transaction Capabilities Application Part (TCAP) component of the SS7 protocol is provided. More specifically, short messaging service can be provided within the distributed architecture of the next-generation communications platform utilizing the TCAP component of the SS7 protocol. A sender of a short message establishes communication with a media server 130 over the IP network. The sender gets the media server 130 to request the SGF 120 to send an SS7 TCAP message for the delivery of the short message. This technique brings the single point access node as described above for the STP Interface for SGF for call processing into transactional processing.

Missed Call Notification—An extension of Caller ID and heavily demanded by wireless operators. Missed Call Notification picks up where Caller ID leaves off. Unlike Caller ID service, which only provides an incoming call number if the wireless phone is on and in the network coverage area, Missed Call Notification provides a continuous, network-based service providing subscribers with the added peace of mind that they will never miss an important call. Now when a subscriber is unable to receive calls, their Missed Call Notification service will capture and store the incoming call information until they become available. At that time, an SMS message containing a list of all missed calls is sent to the subscriber, allowing them to return calls at their convenience.

Another aspect of the present invention is the utilization of a portable application protocol interface (API). This aspect of the invention is directed towards an API that can be stacked in any device and provide a transactional capability. Advantageously, this invention allows a device to avoid the expense of implementing a full SS7 protocol stack. In the telephonic system, this is especially beneficial because the various components of the system are geographically distributed and thus cannot share the same SS7 stack.

Figure 3:
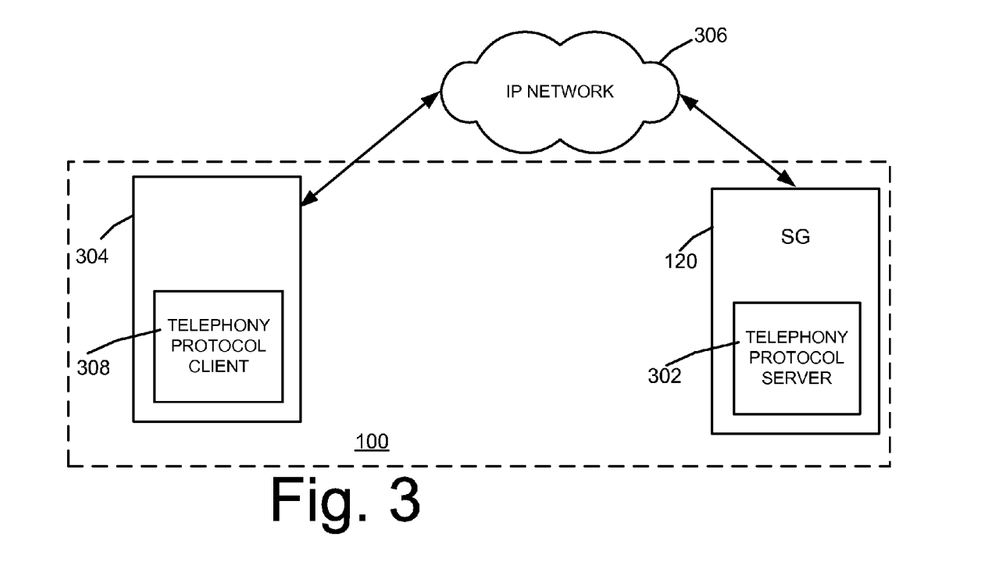
FIG. 3 is a block diagram illustrating a telephony protocol server and a telephony protocol client.

FIG. 3 illustrates an embodiment of the next-generation telecommunications platform 100 employing a portable API. The SGF 120 includes a telephony protocol server 302. The telephony protocol server 302 is described in terms of a suite of SS7 protocols, but that is merely for the sake of clarity and is not intended as a limitation. A component 304 of the next-generation telecommunications platform 100 is in communication with the SGF 120 via a network 306, which is an IP based network. The component 304 includes a telephony protocol client 308, which acts as an API. For the sake of clarity, the component 304 will be described in terms of the CDMS 160, but it is to be understood, that the telephony protocol client 308 can be stacked in some or all of the other components of the next-generation telecommunications platform 100. Among other things, the telephony protocol server 302 and the telephony protocol client 304 are configured to establish, maintain, and terminate communications over the IP network 306.

Figure 5:
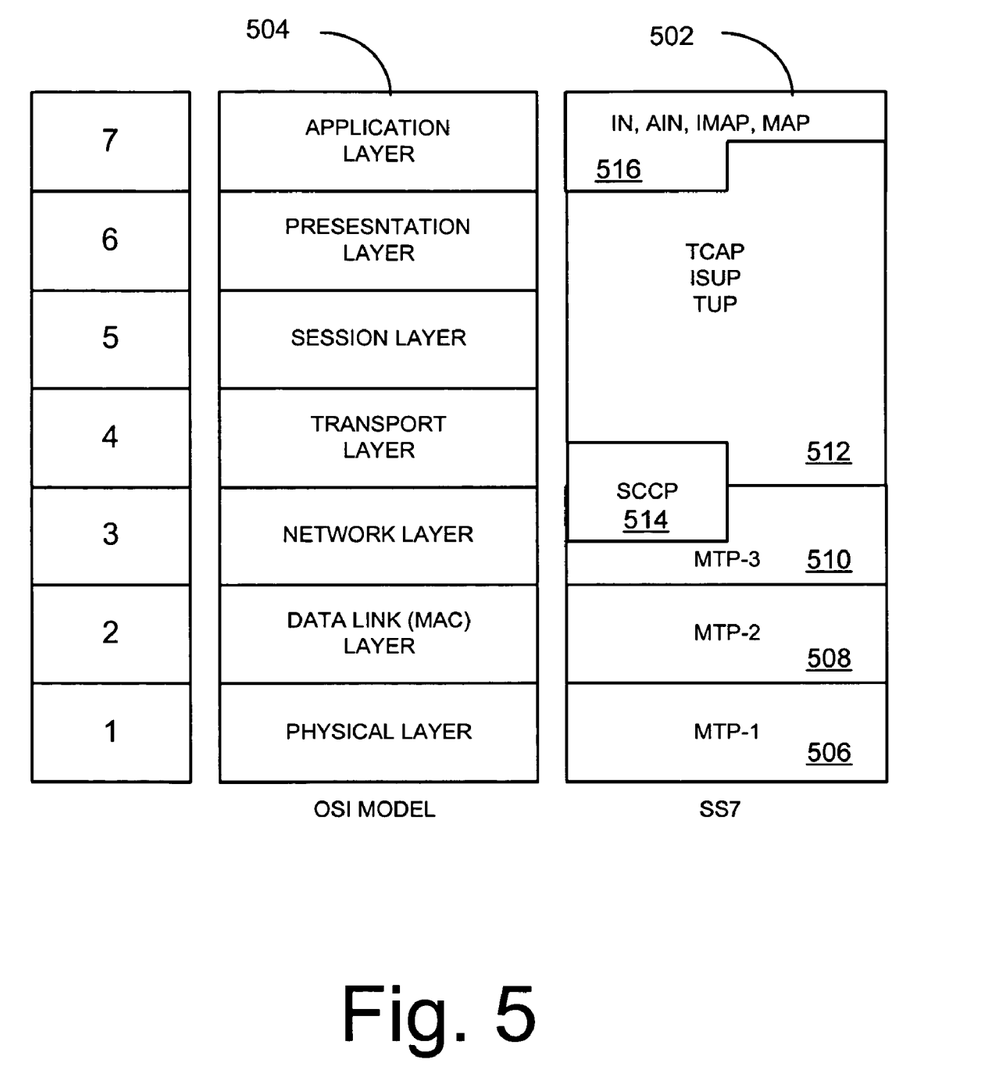
FIG. 5 is a conceptual diagram illustrating relationship between OSI layers and SS7 layers.

FIG. 5 illustrates the conceptual relationship between a telephony SS7 protocol stack 502 and Open Systems Interconnect (OSI) 7-layer model 504 defined by the International Standards Organization (ISO). The SS7 protocol stack includes three layers Message Transport Part (MPT) MPT-1 504, MPT-2 506, and MPT-3 508. MPT-1 504 is equivalent to the OSI physical, electrical, and functional characteristics of the digital signaling link. Physical interfaces defined include E-1 (2048 kb/s; 32 64 kb/s channels), DS-1 (1544 kb/s; 24 64 kb/s channels), V.35 (64 kb/s), DS-0 (64 kb/s), and DS-0A (56 kb/s).

MPT-2 506 ensures accurate end-to-end transmission of a message across a signaling link. It implements flow control, message sequence validation, and error checking. When an error occurs on a signaling link, the message (or set of messages) is retransmitted. MPT-2 508 is the equivalent of the OSI Data Link Layer.

MPT-3 508 provides message routing between signaling points in the SS7 network 111. MTP Level 3 re-routes traffic away from failed links and signaling points and controls traffic when congestion occurs. MTP Level 3 is equivalent to the OSI Network Layer.

Level 512 includes ISDN User Part (ISUP), Telephone User Part (TUP), and Transaction Capabilities Application Part (TCAP). The ISUP defines the protocol used to set-up, manage, and release trunk circuits that carry voice and data between terminating line exchanges (e.g., between a calling party and a called party). ISUP is used for both ISDN and non-ISDN calls. However, calls that originate and terminate at the same switch do not use ISUP signaling.

In some parts of the world (e.g., China, Brazil), the Telephone User Part (TUP) is used to support basic call setup and tear-down. TUP handles analog circuits only. In many countries, ISUP has replaced TUP for call management.

TCAP supports the exchange of non-circuit related data between applications across the SS7 network using the SCCP connectionless service. Queries and responses sent between SSPs and SCPs are carried in TCAP messages. For example, an SSP sends a TCAP query to determine the routing number associated with a dialed 800/888 number and to check the personal identification number (PIN) of a calling card user. In mobile networks (IS-41 and GSM), TCAP carries Mobile Application Part (MAP) messages sent between mobile switches and databases to support user authentication, equipment identification, and roaming.

Level 514 includes the Signaling Connection Control Part (SCCP). SCCP provides connectionless and connection-oriented network services and global title translation (GTT) capabilities above MTP Level 3. A global title is an address (e.g., a dialed 800 number, calling card number, or mobile subscriber identification number) which is translated by SCCP into a destination point code and subsystem number. A subsystem number uniquely identifies an application at the destination signaling point. SCCP is used as the transport layer for TCAP-based services.

The uppermost level 516 includes Intelligent Network (IN); Advanced Intelligent Network (AIN), Internet Message Access Protocol (IMAP), and Mobile Application Part (MAP).

In one embodiment, the interface between telephony protocol server 302 and the telephony protocol client 304 can be TCP based bidirectional exchange of Short Message Peer to Peer (SMPP) messages. SMPP is based on transmission of protocol data units (PDUs) between the client and the server over an underlying TCP/IP network connection. The SMPP protocol defines:

A set of operations and associated Protocol Data Units (PDUs) for the exchange of messages between the client and the server.

The data that a client application can exchange with a server during SMPP operations.

The receiving entity, upon determination of an error condition, must return the associated SMPP PDU with an error code set in the PDU Header. The exchange of messages between the client and server via SMPP may be categorized as messages sent from the client (Transceiver) to the server and messages sent from the server to the client (Transceiver) where Transceiver indicates that only a single TCP connection is used between the client and the server.

The telephony protocol server 302 will receive application requests in the form of SMPP protocol messages or Protocol Data Units (PDUs). ALERTS such as media server reachability will originate on the telephony protocol server 302. Other types of PDUs on the interface entail availability (also used as keep-alives) and error messages.

Among other things, the telephony protocol client 304 will act as a conduit between the application layer (IS41/MAP for example) and the rest of the SS7 stack 504. Once the telephony protocol client 304 has been configured and spawned, it will try to establish a TCP connection to the telephony protocol server 302. Once the TCP connection is established, the client can register itself with the Server, in addition to the routes that it is interested in. The client can also deregister the routes that it is no longer interested in. Registering routes is a request from the server to send route availability updates for the routes on the reach ability list.

The telephony protocol client 304 will also send/receive application level (PDUs) keep-alive messages to/from the telephony protocol server 302. The keep-alive PDU is just an instance of an availability PDU. The keep-alive frequency and timeout value shall be part of the client specific configuration. If the keep-alive is not received within a timeout period of reception inactivity, the client should tear down the TCP connection, and perform tear down house keeping (perhaps mark its routes unavailable in the client routing table).

The clients should generate keep-alives at configurable intervals of transmission inactivity. After the TCP connection has been dropped, the client should attempt, using a reconnect algorithm, to re-establish the TCP connection to the server. Either the client or the server or both may send keep-alives with a status of unavailable, if for example, they are in a maintenance state.

An SMPP session between server and client is initiated by the client first establishing a TCP network connection with the server and then issuing a SMPP Bind (or registration) request to open a session. The Server will reply with the Bind Response PDU either accepting or rejecting the session. A client wishing to submit and receive messages is required to establish only one single transceiver TCP connection. If the bind fails, the client should try again at a gradually decreasing rate.

During an SMPP session, a client may issue a series of requests to a server and, in case of an error, shall receive the appropriate response to each offending request. Likewise, the server may issue requests to the client, which must respond accordingly.

The SMPP session may be defined in terms of the following possible states:

OPEN (Connected and Bind Pending): A client has established a network connection to the server but has not yet issued a Bind request;

BOUND_TRX: A connected client has requested to bind as a client Transceiver (by issuing a bind_transceiver PDU) and has received a response from the server authorizing its Bind request. A client bound as a Transceiver supports the complete set of operations supported by a SMPP Transmitter client and a SMPP Receiver client.

Thus a client bound as a transceiver may send all types of client messages to a server for onward delivery. The client may also receive unsolicited messages from a server.

CLOSED (Unbound and disconnected): A client has unbound from the server and has closed the network connection. The server may also unbind from the client.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of providing telecommunication services from a telecommunications platform having a distributed architecture in which a single interface to a Public Switched Telephone Network (PSTN) through a single component can be exploited by other components in the telecommunications platform, the method comprising the steps of:
   configuring a signal gateway to include a signaling interface to the PSTN and an Internet Protocol (IP) interface to an IP network;
   configuring a telephony protocol server (TPS) to include a signaling interface to the PSTN and an IP interface to the IP network, wherein the TPS includes a communications protocol stack for interfacing to the PSTN and is operable to terminate communications directed to it from a user of the PSTN;
   installing a telephony protocol client (TPC) within at least one additional component of the telecommunications platform, the at least one additional component including an IP interface to the IP network and excluding an interface to the PSTN, the TPC including a portable application program interface (API) for interfacing to the communications protocol stack; and
   establishing communications between the TPS and the TPC over the IP network in such a way that the portable API enables the additional component to interface to the PSTN utilizing the communications protocol stack of the TPS, and the at least one additional component and the TPS sharing a single Destination Point Code (DPC) on the PSTN.

2. The method of claim 1, wherein the TPS comprises a Signaling System #7 (SS7) server having a set of SS7 protocols and the step of establishing communications between the TPS and the TPC further comprises the portable API interfacing to the PSTN through an SS7 protocol in the TPS.

3. The method of claim 2, further including the steps of:
   enabling the API to provide the SS7 server with a message having a payload; and
   enabling the SS7 server to provide the payload of the message to the PTSN using a particular protocol of the set of SS7 protocols, wherein the particular protocol is Transaction Capabilities Application Part (TCAP).

4. The method of claim 3, wherein the message from the API to the SS7 server conforms to Transmission Control Protocol (TCP).

5. The method of claim 3, wherein the payload conforms to Short Message System (SMS) protocol.

6. The method of claim 2, wherein the step of establishing communications includes the steps of:
   sending a bind_transceiver message from the TPC to the TPS to initiate an instance of client session with the server;
   sending a bind_transceiver_resp message from the TPS to the TPC.

7. The method of claim 2, wherein the step of establishing communications includes the steps of:
   sending a keep_alive message from the TPC to the TPS.

8. The method of claim 2, further including the step of:
   determining route availability for communications over the IP network.

9. A telecommunications system platform based on a distributed architecture and providing a single interface to a Public Switched Telephone Network (PSTN) through a single component of the telecommunications system platform that can be exploited by other components in the telecommunications system platform, the telecommunications system platform comprising:
   a signaling gateway function (SGF) including a telephony protocol server (TPS) that implements a communications protocol stack for interfacing to the PSTN and further including an internet protocol IP interface to an IP network, wherein the TPS is operable to terminate communications directed to it from a user of the PSTN; and
   a plurality of additional components, wherein each of the plurality of additional components may include a telephony protocol client (TPC) and an IP interface, wherein the TPC operates to interface with the communications protocol stack in the TPS by establishing a connection over the IP network, thus giving each such additional component the ability to interface with the PSTN utilizing the communications protocol stack in the TPS and sharing a single point code.

10. The telecommunications system platform of claim 9, wherein the communications protocol stack within the telephony protocol server comprises the Signaling System #7 (SS7) protocols.

11. The telecommunications system platform of claim 10, wherein the TPC is a portable application program interface (API) for interfacing with the SS7 protocol stack within the TPS.

12. The telecommunications system platform of claim 11, wherein the API is enabled to provide the SS7 protocol stack within the TPS with a message having a payload, and wherein the SS7 protocol stack is operable to transmit the payload of the message over the PSTN using the Transaction Capabilities Application Part (TCAP) protocol of the SS7 protocols.

13. The telecommunications system platform of claim 12, wherein the message from the API to the SS7 server conforms to Transmission Control Protocol (TCP).

14. The telecommunications system platform of claim 12, wherein the payload conforms to Short Message System (SMS) protocol.

15. The telecommunications system platform of claim 11, wherein the TPC sends a bind_transceiver message to the TPS to initiate an instance of client session with the server, and wherein the TPS sends a bind_transceiver_resp message to the TPC.

16. The telecommunications system platform of claim 11, wherein the TPC sends a keep_alive message to the TPS.

17. The telecommunications system platform of claim 11, wherein the TPS determines route availability for communications over the IP network.

* * * * *